March 26, 1963 W. L. DOELP, JR 3,082,522

FABRICATION OF ELECTRICAL UNITS

Original Filed Sept. 20, 1957

INVENTOR.
WALTER L. DOELP, JR.
BY
F D Prager
ATTORNEY

United States Patent Office 3,082,522

Patented Mar. 26, 1963

3,082,522

FABRICATION OF ELECTRICAL UNITS

Walter L. Doelp, Jr., Doylestown, Pa., assignor, by mesne assignments, to Philco Corporation, Philadelphia, Pa., a corporation of Delaware Original application Sept. 20, 1957, Ser. No. 685,232. Divided and this application Mar. 25, 1959, Ser. No. 801,847

1 Claim. (Cl. 29—497)

Figure 1:
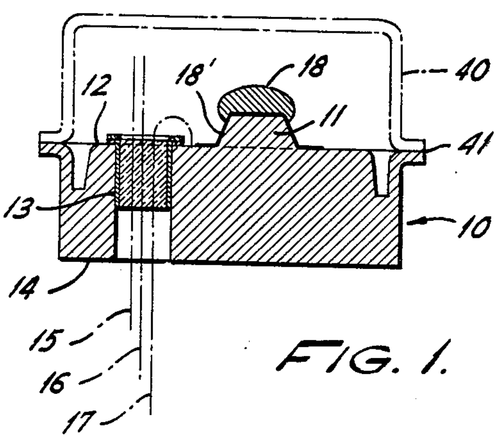

This invention relates to a method of fabricating semiconductor devices. The invention has to do particularly with the information of certain electrode means, as used for instance in so-called alloy junction power transistors. The present application is a division of an earlier application, filed on September 20, 1957, under Serial No. 685,232, now Patent No. 2,916,604, and which pertains to apparatus for fabrication of the present type.

Much progress has been made in such fabrication, during recent years, but the invention has provided further improvement. It had been felt to be desirable to accelerate certain processes, including notably that of forming and connecting collector electrodes, and at the same time to produce transistors which comply more consistently with requirements. Under the most advanced techniques, heretofore available in this field, it was still necessary either to accept the formation of transistors which varied greatly as to some parameters, or to take relatively long periods of time for certain types of electrode formation or connection, for instance by immersion heating or the like, or in some cases to cope with both types of problems. As a result, the cost of finished, high quality transistors has still been somewhat substantial, although progress had been made in eliminating some of the original cost elements.

It is therefore among the general objects of the present invention to avoid complications, inconsistencies, costs, and losses of time, in fabrication of the type referred to. A more specific object is to fuse a portion of a junction type electrode of a semiconductor unit with a metallic or eutectic connector body in such a way as to avoid thermal disturbance of the semiconductor-electrode junction. Another specific object is to accelerate the fusing process while maintaining high quality of the ultimate, fabricated semiconductor unit. Other specific objects of the new process will appear from the description which follows.

In a preferred form of the new process, there is used a metal alloy melting and pure metal dissolving treatment, which is performed, rapidly and yet precisely, by controlled, conductive heating of a metallic support element for the metal alloy constituent. This will be understood upon a study of the following disclosure, wherein the new method will be explained in conjunction with the drawing appended hereto.

Figure 3:
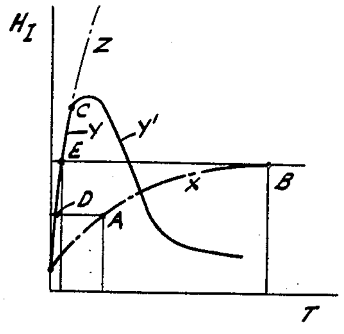
Figure 2A:
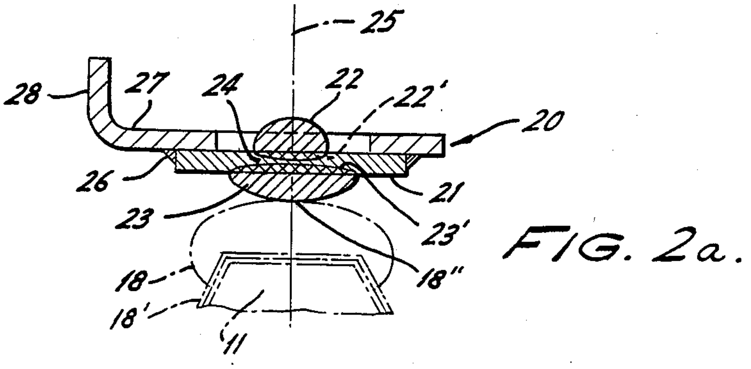
Figure 2B:
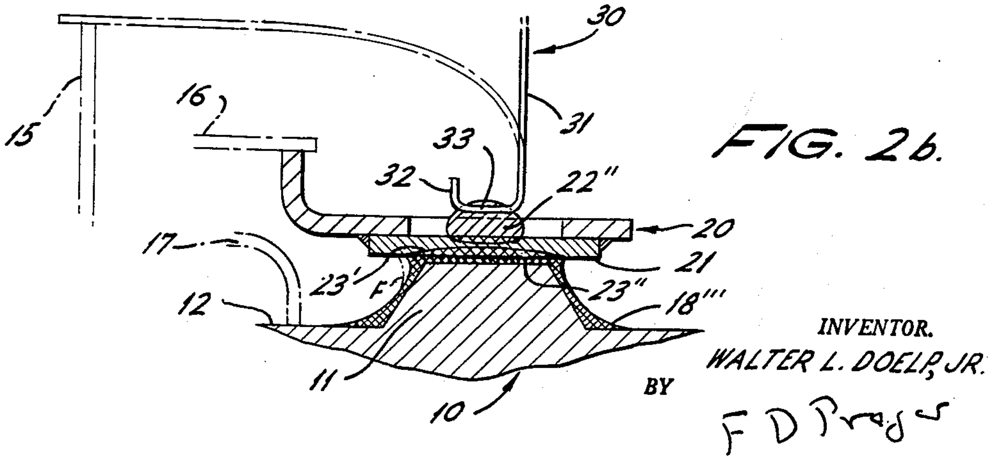

FIGURE 1 of said drawing is a vertical, central sectaken on an enlarged scale and schematically showing a first sub-combination of elements, constituting the metal alloy carrier to be used in the new method. FIGURE 2*a* is a similar section, on a larger scale, showing a second subassembly of elements, which constitutes the central part of the semiconductor device to be completed by this method. FIGURE 2*b* is a section similar to and on the scale of FIGURE 2*a*, indicating how the first and second subassemblies are united with one another. FIGURE 3 is a graphic representation of certain thermal functions, forming part of the new method.

The method serves to unite an electrode connector and/or heat sink member 10, FIGURE 1, with a semiconductor unit such as the transistor subassembly 20 of FIGURE 2*a*. The way in which these elements or subcombinations are united, according to the present invention, constitutes an improved modification of the invention of C. G. Thornton, described in his application Serial No. 590,204, filed June 8, 1956, now Patent No. 3,002,271, entitled "Fabrication Method" and assigned to the assignee of this invention. The Thornton method used an immersion heating process, which constituted one of the prior art techniques, initially mentioned. No such heating is used according to the new method.

In FIGURE 1, member 10 is shown in form of a metallic slug, having an integral pedestal or boss 11 upstanding from a top surface 12, for the support of semiconductor subassembly 20 (FIGURE 2*a*). The latter subassembly is additionally provided, generally at a later time, with an electrode connection member 30 (FIGURE 2*b*), opposite slug 10. Still later, parts 10, 20 and 30 must be electrically connected with suitable circuitry.

For this latter purpose, a glass bead eylet 13 (FIGURE 1) extends, from adjacent top surface 12, through slug 10, toward the opposite or bottom surface 14, and lead wires 15, 16, 17 extend through the glass bead. The upper ends of said wires are, respectively, connected (FIGURE 2*b*) to certain parts of connection member 30, transistor subassembly 20 and slug 10. A semiconductor blank 21, forming the principal part of subassembly 20, is shown as being secured by a solder joint 26 to a tab 27, this tab having a lug 28 for securement to wire 16. Connections 17—10 and 21—27 may be established prior to the operations involved in the present method (see FIGURES 1 and 2*a*); the other connections are made thereafter. In order to protect the device, a metallic closure or so-called hat, 40, may subsequently be cold-welded to the support slug 10, in a flange region 41, FIGURE 1.

The transistor electrode subassembly 20 (FIGURE 2*a*) comprises a small, flat blank 21, made for instance of germanium or the like. A first phase of the fabricating process involves the production of this subassembly, that is, the provision of a bead-shaped emitter electrode member 22 in an upper central part of said blank and of a slightly larger, similarly shaped collector electrode member 23 in a lower central part thereof. These operations may be carried out in any suitable ways, which need not be described herein. The emitter electrode is preferably made of pure indium, with a controlled admixture of gallium, and the collector electrode is preferably made of pure indium without admixture.

As a result of this first phase of the process, the unit 20 comprises regions 22', 23' of alloyed, recrystallized germanium and indium, or so-called "P-type" material, which regions are shown as extending from electrode members 22, 23 into the germanium body 21 and as being defined by boundaries or junctions, indicated by curved lines in FIGURES 2*a*, 2*b*. The said junctions are spaced apart by a flat and extremely thin layer or so-called base region 24 of unalloyed semiconductor material, or so-called "N-type" material, disposed within and parallel to the blank 21. In many cases the thickness of this base region 24 amounts only to a small fraction of a mil.

It is a matter of great importance for the success of the device that the relation between the small regions or bodies 22 and 22', established in the production of the unit of FIGURE 2*a*, should not be disturbed and in fact not greatly modified in the process of securing workpiece 30 to electrode 22. It is of equal importance that the similarly established relation between the small bodies or regions 23, 23' should not be disturbed in undesirable manner, although it must be modified to a substantial extent, in the process of securing pedestal 11 of heat sink 10 to the electrode 23. Heretofore the best practice, in both of these phases of the fabrication process, involved the use of certain immersion techniques, as particularly described in the above-mentioned Thornton application with respect to the attachment of the collector heat sink, and it was believed that the gradual performance of certain heating processes, provided by such immersion, was essential for the production of satisfactory semiconductor units. Upon an intensified study of the processes involved it has now been found that, subject to certain precautions, a relatively abrupt, sudden and short application of heat can be utilized, thereby greatly improving the fabrication process as to the speed and economy thereof, while maintaining high and satisfactory quality of the ultimate product.

A feature of importance in this connection has to do with the provision of a secondary collector soldering element or bead 18 (FIGURE 1), which desirably consists of a cadmium-indium mixture and particularly of the "eutectic" of said materials. This soldering element is initially secured to a surface 18' on the boss 11, which surface may desirably be "tinned" with pure indium and which is positioned opposite the electrode member 23 (FIGURE 2*a*). The beads 18, 23 are rounded so as to make it possible to initially establish a small area 18'' or so-called "point" of contact therebetween, and the mass and volume of the bead 18 is so selected that upon the subsequent melting thereof, it can dissolve all of the indium 23 and 18' and no more.

In the process according to the present invention the eutectic 18 is briefly exposed to a temperature sufficient to melt the same but only to dissolve the indium 23 into the eutectic contacting it. The required heating is done for instance by apparatus, not shown herein but fully shown in said earlier application, and which comprises a soldering pin contacting top surface 12 of slug 10. Such a pin can be set down on said surface for a short time and can, during said time, be momentarily heated to cause conductive heating of members 18, 23 in the heat cycle of FIGURE 3, which will be described hereinafter.

Thus the eutectic-indium contact area 18'' is exposed to a temperature high enough to melt the eutectic 18 but not high enough to melt the indium 23, this narrow control being applied in order to avoid disturbance of the alloy region 23'. As the eutectic 18 melts and liquefies, which occurs as soon as the temperature thereof rises to the slightest extent above a very sharply defined melting and freezing point, the liquid eutectic rapidly dissolves the indium 23 and becomes indium-rich. The resulting liquid metal then flows along the sides of the boss 11, partly by virtue of the inherent adhesion of this liquid metal to the indium layer and partly by virtue of mechanical pressure which is maintained on the contact area 18'' and on the eutectic-indium interfaces existing during the rapid, more or less momentary, melting and dissolving process.

Thus the original solder member 18 and electrode member 23 are rapidly converted into a homogeneous and very thin electrode layer 23'' of indium-rich cadmium-indium alloy, which adheres both to the top surface of boss 11 and the bottom surface of blank 21, FIGURE 2*b*. The ultimate thickness of this layer 23'' is controlled by the cohesion of the liquid metal therein, and the layer remains solid and imperforate under such pressures as are applied thereto in the process according to this invention. The required, accurately parallel relationship between the blank 21 and the top of boss 11 is insured by suitable guiding mechanism, as described in the parent application. The excess of enriched alloy, flowing along the indium tinned surface 18' of the boss 11 and slug 10, forms a fillet 18''' on said surfaces.

A feature of great importance for the present process is that substantially all of the heat provided for melting the eutectic and dissolving the indium is supplied to these materials by conduction through the slug 10. It seems to be largely by virtue of this feature that it is no longer necessary, as it was in the immersion process previously employed, to control the successive temperatures of all thermally coupled elements so as to insure a gradual tapering off of the rate of heating up. It is, however, important that the rapid heating of the various parts, and particularly of the particles of eutectic, be controlled, in a way which differs greatly from the control heretofore applied, for instance in accordance with the immersion heating method. In this connection the following should be noted.

A comparison between the new and the former process appears in FIGURE 3. In this figure the heat input into the indium, to be dissolved along the interface 18'' and the aforementioned subsequent interfaces, is shown at $H_I$, while time is plotted along axis T. The broken line curve X is representative of the manner in which an immersion process, for instance that of said Thornton application, supplied heat to the eutectic body and thereby caused the dissolving of the indium body. The heating process in that case was gradual and gentle, as indicated by the slight and gradually decreasing inclination of the curve X from a horizontal direction. At point A on the curve, sufficient heat had been supplied to the eutectic, along a variety of paths of heat transfer, to melt the first particles of the eutectic, which was promptly followed by the dissolving of the first particles of indium. Due to the provision of a finite although small mass of eutectic and of indium, and due to the gentleness of the heating process, all of the eutectic had been liquefied only at point B on the curve. At that same point, or substantially so, all of the indium had been dissolved. On the axis T, point B corresponded for instance to a time lapse of twenty or thirty seconds after the start of the process. Due to the gradual type of heating employed, the temperatures of the pedestal were never significantly higher than those of the indium.

The full line curve Y shows, for comparison, the heat input applied to the indium according to the present invention. It will be noted that the initial rise of this curve is much steeper than that of curve X, and correspondingly the heat input into the pedestal is still more rapid, so that it may briefly and locally establish extremely high temperatures, in the pedestal. If the heat input into the indium, curve Y, were allowed to continue upwardly, as indicated at Z, it would ultimately level off, in a manner similar to that of curve X, but this would happen only after a heat input of such magnitude as to destroy the electrode members and associated parts. Actually, however, this heat input, as shown by the rise of the curve Y, is interrupted at or adjacent a predetermined point C, where it has not as yet created a temperature, anywhere in the pure indium, sufficient to melt this material. When this point C has been reached, the input of heat is interrupted and cooling of the small electrode assembly is initiated, as indicated by the turning and the subsequent falling of the curve Y'.

Heat input values, corresponding to those shown at A and B on the curve X, are indicated at D and E on the curve Y, both of these points lying below the point C and on the steeply rising and substantially straight part of the curve. It will be seen that the completion of the heat input, which substantially coincides with the completion of the dissolving process, can be achieved in a time interval much shorter than that allowed in the immersion process. For instance, a heating period of one or two seconds, or sometimes a small fraction of a second, has been found sufficient, in the use of the new method. The protection against overheating of indium, which in the case of curve X was obtained by the gradual decrease in the rise of the curve, is here obtained by the interruption of the original, much steeper curve, at point C.

It has been found that substantially no loss, as to consistency of production of satisfactory semiconductor assemblies, is incurred by the change from the gradual immersion heating to the more rapid, suitably interrupted heating, effected entirely by conduction through the slug and pedestal. Particularly the new process has been found to be substantially free from the danger that asymmetrical flow of metal occurs at some points, such as that shown at F, in FIGURE 2*b*, where some minute amounts of liquid metal 23'' might flow beyond the exact boundary of the recrystallized alloy zone 23'. The danger of such minute overflowing of the solder-like material 23'' is ever-present, particularly since it is not always possible to insure fully symmetrical fluxing of the pedestal area, to be wetted by the metal. If and when such overflowing occurs it can seriously impair the utility of the transistor. The new process, in spite of the momentary use of high temperatures, effectively avoids such overflowing and other dangers and difficulties.

While only a single way of performing the new method has been described, it should be understood that the details thereof are not to be construed as limitative of the invention, except insofar as is consistent with the scope of the following claim.

I claim:

In the fabrication of a semiconductor: providing a semiconductor having a junction type electrode formed thereon and including an external bead of the electrode metal; fusing to a relatively massive metallic contact member a bead of eutectic of said electrode metal and of other material so selected that said eutectic has a melting point lower than the melting points of the electrode metal, metallic contact member, and semiconductor and that said eutectic when molten is a solvent for said electrode metal; placing the external surface of the electrode bead in contact with the external surface of the eutectic bead; and, while maintaining such contact, supplying heat to said eutectic by the step and exclusively by the step of rapidly conducting intense heat into said metallic contact member and thereby into said eutectic in an amount just sufficient to melt said eutectic bead, thereby to dissolve electrode metal of said external bead into the melting eutectic, and thus without substantial heating of said external bead and electrode, closely thermally bonding said electrode to said contact member.

References Cited in the file of this patent

UNITED STATES PATENTS

| | | |
|---|---|---|
| 1,695,791 | Yunck | Dec. 18, 1928 |
| 2,166,998 | Morgan | July 25, 1939 |
| 2,671,958 | Block | Mar. 16, 1954 |
| 2,842,841 | Schnable | July 15, 1958 |
| 2,870,052 | Rittmann | Jan. 20, 1959 |
| 2,897,587 | Schnable | Aug. 4, 1959 |
| 2,947,079 | Schnable | Aug. 2, 1960 |
| 2,985,806 | McMahon et al. | May 23, 1961 |
| 3,002,271 | Thornton | Oct. 3, 1961 |